Fig. 6

# United States Patent Office 3,444,627
Patented May 20, 1969

3,444,627
METHOD AND APPARATUS FOR DRYING GOODS IN LAYERS
Olli Heikinheimo, Helsinki, Finland, assignor to Plan-Sell Oy., Helsinki, Finland, a corporation of Finland
Filed Oct. 24, 1967, Ser. No. 677,577
Claims priority, application Finland, Oct. 24, 1966, 2,805/66
Int. Cl. F26b 3/06
U.S. Cl. 34—23
16 Claims

ABSTRACT OF THE DISCLOSURE

The method according to the invention is principally characterized by the steps comprising feeding piece goods or weblike goods and a first elongated carrier into the entrance end of a drying chamber to form a goods layer supported on said carrier, at the terminal longitudinal position of the carrier and layer transferring them a distance at least equal to the thickness of the layer in a direction normal to the broad extent of the first carrier, forming another layer of goods on a second, similar carrier and feeding them in a corresponding manner into said terminal position in the drying chamber and transferring it a direction normal thereto to bring it into stacked relationship with the first carrier and layer while transferring said first carrier and layer correspondingly in the said normal direction, repeating the said operations to form a pile of layers of goods and carriers therefor in the chamber comprising the desired number of goods layers, circulating drying gas through the thus stacked carriers and layers of goods, and removing the first stacked carrier and layer in a dried state from said pile at the opposite, discharge end of the drying chamber. Two embodiments of apparatus for carrying out the method of the invention are disclosed and claimed herein.

BACKGROUND OF THE INVENTION

Field of the invention

This invention relates to a method and an apparatus for drying goods in layers in a drying chamber by means of drying gas such as air passed through the chamber and by transferring the goods stepwise vertically through the chamber. The object of the invention is to provide an effective and, as to its operational cost, advantageous continuous drying method which is particularly applicable for drying timber such as veneer and sawn goods.

Description of the prior art

In Finnish Patent No. 33,108 there is disclosed a continuous method for drying wood veneer, according to which a full-length veneer web, such as it emerges from the veneer machine, is fed in a direction transverse to the grain by means of a supporting conveyor net through a long dryer, while at the same time applying to the veneer by means of an upper stationary steel wire mat a force sufficient to maintain the veneer relatively smooth but insufficient to cause tearing as the veneer is shrinking. This method has later been modified to make the upper mat movable. These known methods are practicable and reliable, but their drawbacks are high capital costs and relatively high operational costs due to large power requirements and the rapid wearing of the steel wire nets.

SUMMARY OF THE INVENTION

Goods such as wood veneer are dried in layers in a drying chamber by passing heated air through the chamber in intimate contact with stacked layers of goods. Each layer of goods is supported upon an elongated supporting means which contacts the layer at spaced points but is otherwise open to the passage of air therethrough. The invention provides a novel mechanism whereby the elongated supporting means are fed into the drying chamber while the parts of the goods which are to form the layer are deposited thereon. After the supporting means has been fully loaded and is positioned entirely within the chamber, it is then moved out of the first, feeding plane into a second plane parallel thereto to form a stack with the first fed supporting means and its layer of goods and to permit the next elongated supporting means to be fed with its layer of goods into the chamber. The supporting means and the parts cooperating therewith while they are in the stack are so dimensioned that the layers of goods are held between successive supporting means so that any substantial bulging of the goods during drying is prevented, while permitting the goods to shrink freely longitudinally thereby preventing the goods from breaking.

A plurality of the thus stacked supporting means with the layers thereon are then advanced stepwise through the drying chamber in a direction normal to the longitudinal extent of the supporting means. As each supporting means and its layer in turn reaches the exit end of the stack, it is again fed forwardly through the chamber. At the forward, discharge end of the chamber the pieces of material making up the layer of goods are discharged from the supporting means.

In the embodiment shown the supporting means has a body made up of a plurality of parallel chains, the links of which are free to pivot in one direction relative to each other but can not pivot in the other direction past the plane of the longitudinal extent of the supporting means. Means are provided at the exit end of the drying chamber for progressively folding the supporting means in said one direction as such supporting means is discharged from the chamber, and for returning the supporting means longitudinally of the diving chamber to the rear, entrance or feeding end thereof. For this purpose there is provided a first endless conveyor having projections thereon which engage the supporting means as it is being returned to the entrance, feeding end of the drying chamber. A second conveyor, which overlies the path of the supporting means which is being fed into the drying chamber, is connected to the first conveyor so as to travel synchronously therewith. The second conveyor means likewise has projecting fingers which engage the body of the supporting means so as to feed the supporting means forward along the said first feeding plane in the drying chamber.

In a first disclosed embodiment of the invention, the elongated supporting means enter the drying chamber in a first plane disposed adjacent the top thereof. Longitudinally extending upper track means are provided at the top of the chamber to support the supporting means in said first plane, as by means of longitudinally spaced rollers or wheels mounted on the supporting means and running on the upper track. The upper track is provided with longitudinally spaced gaps which are bridged by gates when a supporting means is being fed forwardly. When the supporting means has been fed completely into the drying chamber and into its terminal position therein, the gates are opened so as to permit the wheels on the supporting means to enter into longitudinally spaced vertically disposed guideways aligned with the gaps in the tracks. The supporting means then descends into a second plane beneath and parallel to the said first plane. Thereupon the gate means are closed and a second supporting means is fed into the drying chamber along said first plane in the same manner.

At the bottom of the longitudinally spaced vertical guideways there are provided escapement means which retain the stacked supporting means and the layers of goods thereon. At the same time that the gates at the upper ends of the vertical guideways are opened to admit a further loaded supporting means into the stack, the escapement means at the bottom of the vertical guideways are opened to permit the discharge of the lowest stacked, loaded supporting means onto the lower conveyor tracks, whereby it is then fed to the discharge end of the drying chamber by engagement with the driven lower conveyor.

In a second embodiment of the invention the supporting means and the layers of goods thereon are first fed into the bottom of the drying chamber by engagement with a driven lower conveyor until they reach a terminal position wholly within the chamber. Thereupon the lowermost loaded supporting means is lifted so that the supporting and guide rollers thereon are introduced into the bottoms of longitudinally spaced vertical guiding means in the form of guideways wherein they are retained by means such as movable pawls. At the same time, a gate positioned at the top of the vertical guiding means, and forming a part of an upper track, is opened, whereby to permit the topmost supporting means and its layer of goods to be lifted out of the vertical guideways. Upon the repositioning of the gates, the thus freed supporting means lies upon the upper track, along which it is then advanced toward the discharge end of the drying chamber by engagement with a driven upper conveyor.

BRIEF DESCRIPTION OF THE DRAWING

The above and further objects and novel features of the invention will more fully appear from the following description when the same is read in connection with the accompanying drawings. It is to be expressly understood, however, that the drawings are for the purpose of illustration only, and are not intended as a definition of the limits of the invention.

In the drawings, wherein like reference characters refer to like parts throughout the several views.

DESCRIPTION OF THE PREFERRED EMBODIMENTS

Figure 1:
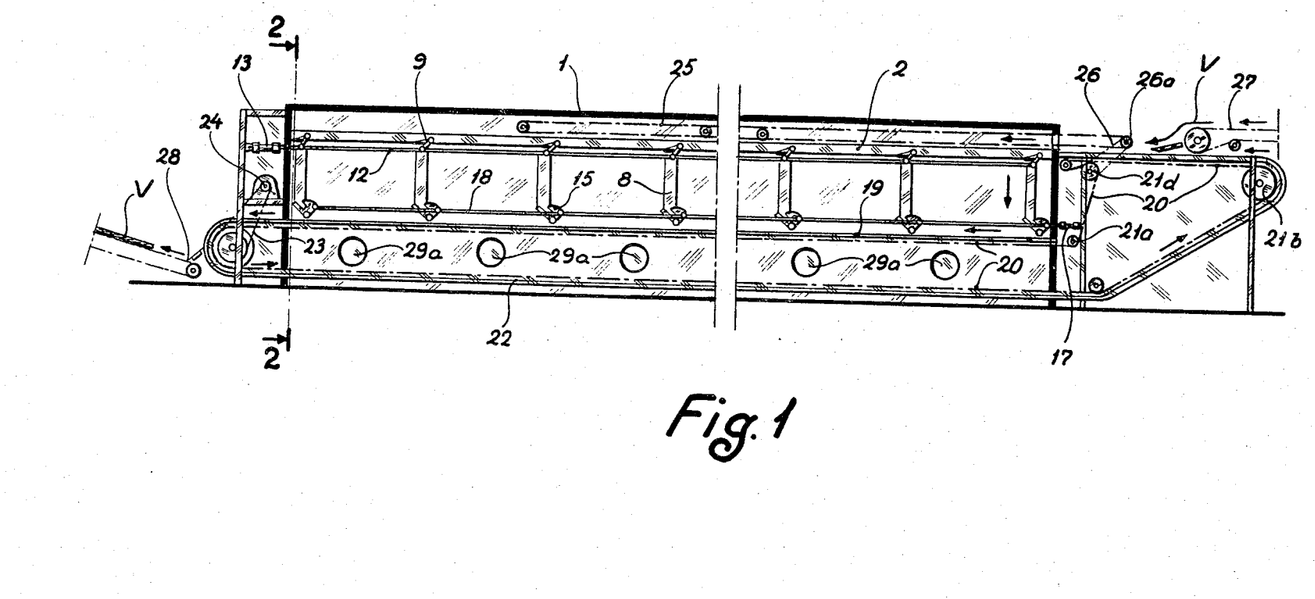
FIG. 1 is a view in longitudinal vertical section through the drying chamber of a first illustrative embodiment of the invention, the elongated supporting means and the layers of goods thereon being omitted for clarity of illustration.
Figure 2:
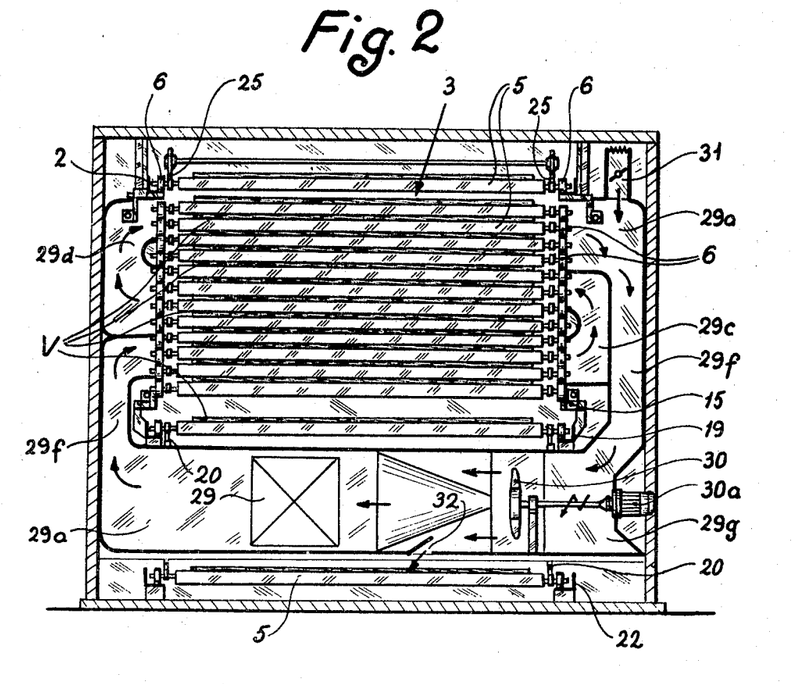
FIG. 2 is a view in transverse vertical section through the drying chamber on a larger scale, the section being taken along the line 2—2 of FIG. 1.
Figure 3:
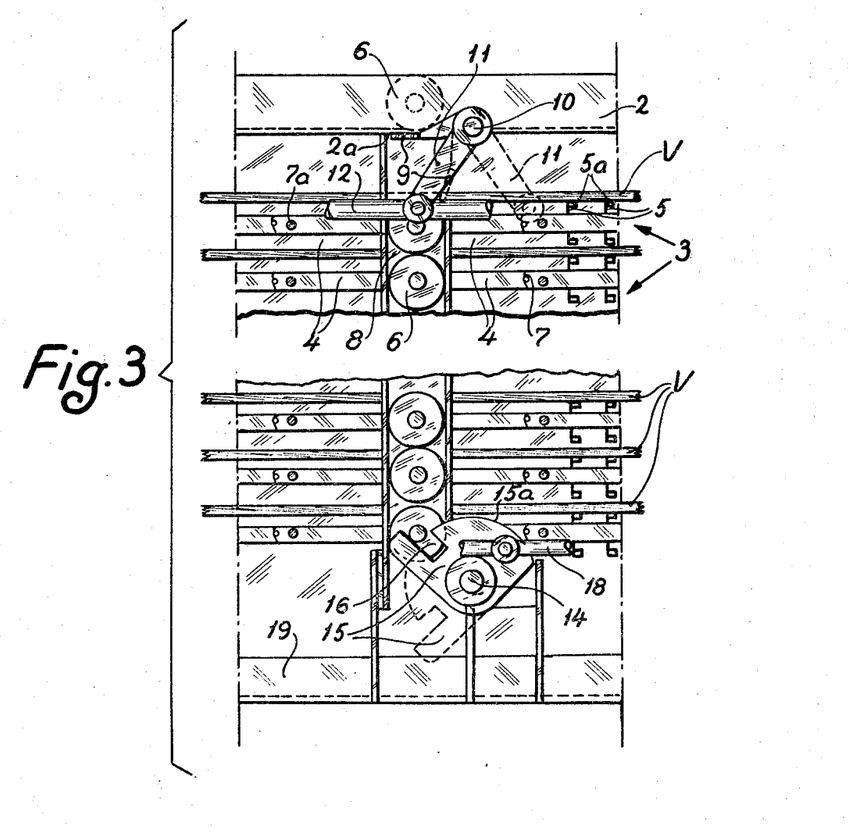
FIG. 3 is a composite view showing fragments of stacked supporting means with layers of goods thereon at the upper end and at the lower end of a vertical guideway within the drying chamber.
Figure 5:
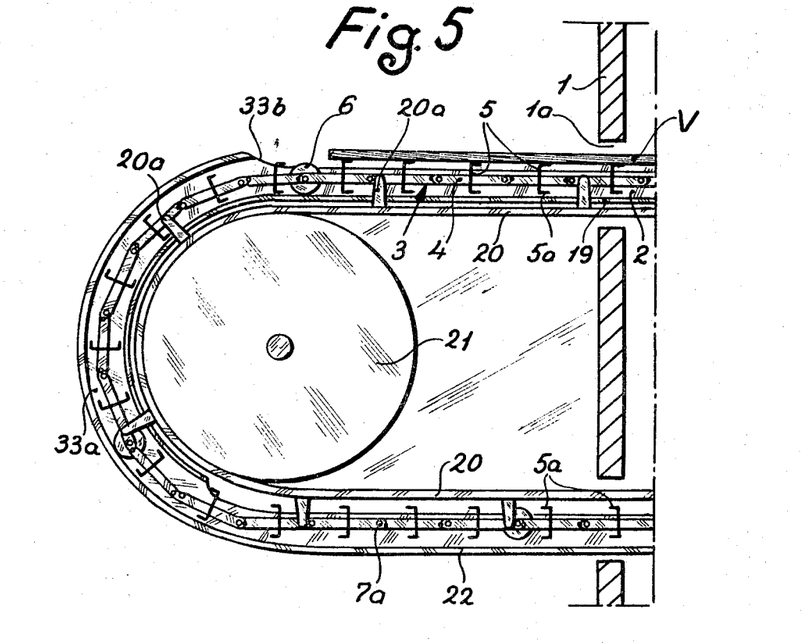
FIG. 5 is a fragmentary view on an enlarged scale in vertical longitudinal section through the forward, discharge end of the drying chamber, the figure particularly showing the manner in which the supporting means is folded or diverted to be returned beneath the drying chamber toward the rear, entrance end thereof.

Turning now to the embodiment of FIGS. 1–5, inclusive, reference character 1 designates an elongated drying chamber into which elongated carrier supports or supporting means 3 are fed from the rear or right-hand end thereof as shown in FIG. 1 toward the front or left-hand end thereof. Adjacent the top of the right-hand end wall of the chamber there is provided a feeding opening with which there are aligned opposite parallel upper track rails 2 which are shown more particularly in FIG. 2. Elongated carrier supports 3 having a length somewhat less than the length of the compartment within the drying chamber are fed into the chamber 1 through such feeding opening, and as they are thus fed pieces of web-like material V such as wood veneer, sawed wood, or the like are deposited upon the support 3 by a conveyor 27. There is thus progressively formed upon the support as it is being fed into the drying chamber a layer of goods or material which is likewise designated V in the various figures. The supporting means 3 is made up of two similar parallel chains 4, the links of which are pivotally connected by pintle pins 7a. Corresponding links of the two chains 4 are rigidly connected by generally vertically extending goods supporting plates 5, such supporting plates having horizontally extending upper and lower flanges 5a thereon as shown in FIGS. 3 and 5. As shown in FIG. 3, one of each pair of successive links of each chain 4 is provided with a sidewardly projecting short pin 7, the next adjacent link having an end thereon extending beyond pintle pin 7a so as to overlie and engage the pin 7 when the supporting means 3 lies flat. It will be seen that each chain 4 is thus prevented by the pins 7 from moving out of their plane in an upward direction but may turn downwardly with respect to such plane as the supporting means are discharged from the drying chamber around the driven pulley 21, to be described.

At uniformly spaced intervals along their length each of the supporting means 3 is provided with transfer wheels or rollers 6 which are journalled on stub axles extending outwardly from the supporting means proper. Wheels 6 run along and are supported by the upper side track rails 2 at the top of the chamber, as shown in FIG. 2, when each of the supporting means 3 is being fed into the chamber 1. Disposed at uniformly spaced intervals longitudinally of the chamber 1, with a spacing equal to that between successive wheels 6 on the supporting means 3, are a plurality of vertically extending vertical guideways 8 which are positioned on both sides of the chamber to receive the respective sets of wheels 6. Above each of the vertical guideways 8, the corresponding track rail 2 presents a gap or discontinuity 2a of the same width as the guideway. The gaps 2a of all of the vertical guideways 8 may be simultaneously closed to permit the feeding of a first or uppermost supporting means 3 along the track rails 2 into its terminal poistion within chamber 1. When the supporting means has reached such position, the gaps 2a are opened, thereby permitting the wheels 6 on the uppermost supporting means to fall into the top of the vertical guideways 8, so that the supporting means 3 now lies in a second plane beneath and parallel to the first or longitudinal feeding plane thereof.

The means for thus selectively opening and closing the gaps 2a in the track rail 2 take the form of trap doors 9, each of which is supported on one arm of a bell crank affixed to a transverse rock shaft 10, as shown in FIG. 3. The other arms 11 of each of the bell cranks are pivotally connected by a horizontal push rod 12 which is selectively reciprocated by a fluid operated reciprocating motor 13, as shown in FIG. 1. When the push rod 12 is thrust to the right in FIG. 1, the gates 9 are swung downwardly into the position shown in dash lines in FIG. 3, thereby to open the gaps 2a in the track rails 2. When the rod 12 is pulled to the left, the gates 9 are returned to their horizontal position so as to close the gaps 2a.

At the lower end of each of the vertical guideways 8 there is also positioned a closing and dropping mechanism consisting of a generally arcuate closing plate 15 which is affixed to a transverse shaft 14. Each of the plates 15 has a radial slot 16 therein, the slot being of sufficient width to receive the outer ends of the stub shafts carrying the transfer wheels 6. Beyond the slot 16 the plate 15 has an elongated portion or finger which, when the plate is in the solid line position of FIG. 3, underlies and engages the outer end of the stub shaft carrying the wheel 6, whereby to provide a support for the stacked supporting means 3 and the layers of goods thereon. When the plates 15 are rotated counterclockwise from the solid line position to the dash line position thereof (FIG. 3), the lowermost supporting means 3 is permitted to travel therewith, the stub shaft mounting wheel 6 finally being discharged downwardly to escape from the slot in the plate 15. The next lowermost supporting means 3, however, is permitted to travel only until its stub shaft engages the arcuate surface 15a of the plate 15. Upon clockwise turning of the plate 15, such next lowermost supporting means 3 then assumes the position occupied by the lowermost supporting means shown in FIG. 3.

The described rocking of the plates 15 is effected by a second, lower reciprocable fluid operated motor 17 which is connected to a lower horizontal push rod 18. Rod 18 is pivotally connected to each of the plates 15 along one side of the apparatus, so that all of the plates 15 operate in unison.

As shown in FIGS. 1, 2, and 3, there are provided the lower parallel track rails 19 disposed beneath the lower ends of the vertical guides 8. Upon the discharge of the lowermost supporting means 3 from the vertical guideways by the plates 15, the transfer wheels 6 on such support means now lie upon the track rails 19. Such thus discharged supporting means is now moved forwardly within the drying chamber so that it progressively travels through a discharge opening 1a through the left-hand end wall of the drying chamber.

The discharge of the supporting means 3 from the drying chamber is effected by a lower driven belt conveyor which is made up of two similar laterally spaced parallel endless belts 20 which run over the pulley 21, as shown in FIGS. 1 and 5. The belts 20 extend in a lower run from the pulley 21 to a lower pulley 21a beyond the rear end of the drying compartment, thence upwardly to an idle pulley 21b which is similar to pulley 21, forwardly in a horizontal run to a pulley 21c, rearwardly to a pulley 21d, downwardly to a pulley 21e, and thence in a second upper horizontal run back to the driven pulley 21. The pulley 21 is driven by a variable speed electric motor 24 through a chain transmission 23, as shown in FIG. 1. The supporting means 3 being returned to the rear of the drying compartment travels with conveyor belts 20 about pulleys 21a and 21b, but leave the belts 20 at pulley 21c.

The apparatus is provided with a horizontal upper conveyor 25 made up of two laterally spaced belts as shown in FIG. 2, the lower run of the belts being selectively operated to travel in a direction from right to left in FIG. 1. Conveyor 25 is driven as by means of a belt or chain 26 entrained over a pulley or sprocket which is fixed to the pulley 21d and over a pulley or sprocket 26a which is disposed at the right-hand end of the conveyor 25. Material, such as pieces of veneer V which are discharged from the conveyor 27 upon the support means 3 as the supporting means 3 is fed thereunder by belt conveyors 20 and 25, enters between such support means 3 and the overlying conveyor 25, As above noted, after such first supporting means has been fully loaded with veneer or the like and has reached its inner terminal position within the drying chamber 1, it is dropped from the first upper plane into a second plane at the top of the stack.

Figure 4:
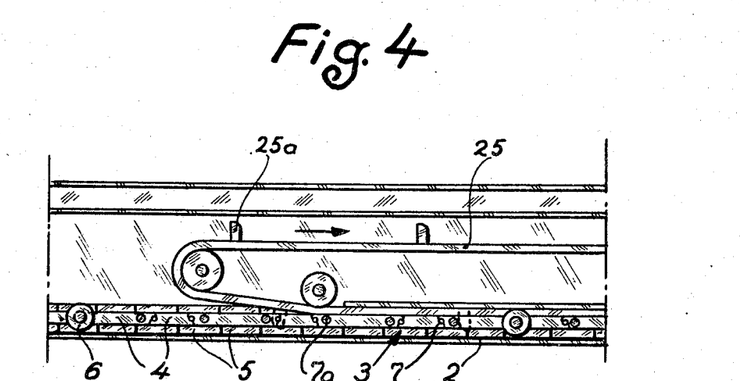
FIG. 4 is a fragmentary view in vertical longitudinal section through the upper portion of the drying chamber at the forward, inner end of the upper driven conveyor for forwarding the uppermost supporting means.

Each of the conveyors 20 and 25 is provided with a plurality of longitudinally spaced outwardly projecting dogs or fingers 25a, as shown in FIGS. 4 and 5, which engage and feed the support means 3. The spacing of the dogs 25a on each of the conveyors 20 and 25 is such that the dogs engage portions of the supporting means 3 immediately inwardly of the transfer rollers 6, as shown in FIG. 2, when the supporting means are disposed with portions thereof parallel to and closes to the respective conveyors. Thus the then upwardly projecting fingers 25a on the belts forming the lower conveyor 20 engage the supporting means 3 which has just been dropped from the stack under the lower track rails 19, said conveyor feeding such supporting means to the left out of the discharge opening 1a in the left-hand end of the drying compartment and around the above-mentioned driven pulley 21. An arcuate outer guide rail 33a having an entering end 33b is disposed outwardly of and concentric with the pulley 21, the connection between the links of conveyor 20 being such, as above explained, to permit such travel of the support member about the pulley 21. As the supporting means being discharged from the drying compartment travels around pulley 21, it discharges its load of dried material upon a further conveyor 28 which carries it away from the compartment.

After the supporting means 3 has been fed around pulley 21 by conveyor 20, the conveyor 20 then returns the support member with the transfer rollers 6 thereof riding upon the lower track rails 22, finally causing the support member to travel about the pulley 21b disposed at the entering end of the drying compartment. As above noted, pulley 21b is similar to pulley 21 except that it is idle; pulley 21b is provided with an outer arcuate guide rail, not specifically shown, which is similar to the arcuate guide rail 31a. Upon entering beneath the entering end of the upper conveyor 25, the then downwardly projecting dogs 25a on the belt forming the conveyor 25 feed the support member 3 to the left (FIG. 1) to its terminal position about the top of the stack.

The height of the guiding elements 8 is such that they receive, one upon the other and supported by the transfer wheels 6, such a number of carrier supports that the veneer or the like thereon will have time to dry during its transfer from the upper zone of the drying chamber 1 to its lower zone. The transfer wheels 6 and the support plates 5 are so dimensioned that the lower flanges 5a on the plates 5 substantially engage the upper surface of the veneer V on the next lower carrier support 3. This prevents any substantial bulging of the veneer as it is dried, but at the same time allows the veneer to shrink freely longitudinally, thereby preventing its breaking.

The interior of the drying chamber 1 is provided with heated gas such as air which is supplied by a plurality of longitudinally spaced heaters 29 disposed beneath the drying chamber. A horizontal discharge duct 29a leads from each of the heating means 29 and is connected to the lower end of a first vertical duct 29b at the left side of the drying compartment as it is shown in FIG. 2. Air is forced through each of the heating means 29 by a suitable fan 30 driven by a motor 30a. The thus impelled heated air travels to the right from the upper end of a duct 29b laterally through the lower portion of the stack of supporting means and the veneer disposed thereon. Upon emerging from the right-hand side of the stack the air is received in a further vertical duct 29c which returns it through the intermediate portion of the stacked supports and veneer to a further duct or header 29d. Finally, the heated air travels laterally through the supports and veneer at the upper end of the stack thereof and is returned through a header 29e to a duct 29f which leads it to the intake end of a shroud or housing 29g for the fan 30. Fresh air can be admitted to the circulation through a damper controlled inlet 31, and moist air can be removed from the circulation through adjustable outlet openings 32, as shown in FIG. 2. Although the heated air travels in a zig-zag manner through the stack of carrier supports and layers of material V thereon, its general direction of travel in compartment 1 is from the bottom to the top thereof.

In operation a veneer web of a length equal to that of the carrier support 3 is brought, as a coherent web or as pieces, by means of conveyor 27 to the feeding end of the drying chamber 1, and simultaneously a carrier support 3 is brought to the same point by means of transfer conveyor 20, so that the veneer is deposited onto the carrier support 3 and, supported on the same, is transferred by means of transfer conveyor 25 into the drying chamber. When the transfer wheels 6 of such carrier support 3 have reached the gates or trap doors 9, the cylinder 13 receives an impulse, the trap doors are thereupon turned to the position shown by broken lines in FIG. 3, and the carrier support 3 thus fed into the drying chamber, with its accompanying veneer, drops onto a pile consisting of carrier supports 3 held in position by the guiding elements 8.

At the same time cylinder 17 receives an impulse causing the closing and dropping mechanism 15, 16, 18 to turn to the position shown in FIG. 3 by broken lines, so that the carrier support disposed lowest in the pile will, with its accompanying veneer, be deposited onto the conveying track 19. After these operations have taken place, the trap doors 9 and the dropping mechanism 15, 16, 18 are returned to their initial, full line positions. The conveyor then transfers the support member which has been discharged from the stack around the turning pulley 21, whereby the veneer is transferred to the discharge conveyor 28 and the carrier support 3 travels along the conveying track 22 back to the feeding end of the drying chamber 1. The movement of transfer conveyors 20 and 25 is synchronized with the movement of conveyor 27 bringing fresh veneer to the feeding end of the drying chamber, so as to bring each particular time simultaneously a veneer web and a carrier support to the feeding end; the length of the feeding movement of the transfer conveyors is equal to that of the carrier support, so that the carrier support will move stepwise back to the feeding end of the drying chamber. In this manner each veneer layer is stepwise transferred from the upper end of the drying chamber 1 to its lower end, during which time it dries and is then discharged in a dry state from the lower end of the drying chamber.

In the drying chamber according to the invention the fans and heating batteries are positioned at the lower end of the drying chamber, the air circulation thus occurring in a guided manner in a generally upward direction countercurrently with respect to the movement of the veneers, thermodynamically correctly, so that the hot, dry air will contact the most dry veneer whereas the cooling, moistening air contacts successively more moist veneer webs. The height of the drying chamber can, by virtue of the just mentioned drying principle, be reduced to a mere fraction of that of conventional continuously operated dryers. The heat loss is also reduced with respect to the conventional by virtue of the fact that only one inlet opening and only one outlet opening are employed. By virtue of the small height of the drying space for each veneer web, the quality of the dried veneer is high.

The above described controls for the cylinders 13 and 17 are not specifically shown. Such controls may include an electromagnetically controlled reversing valve for supplying fluid under pressure selectively to both ends of the cylinders 13 and 17, such valve being under the control of a microswitch positioned to be closed by a carrier support 3 after it has reached its terminal position in the first, upper feeding plane thereof above the stack of carrier supports. The closing of the microswitch will actuate the valve to cause cylinder 13 to thrust rod 12 to the right and will actuate the valve to cause cylinder 17 to thrust rod 18 to the left. The control circuit for the valve may include a suitable time delay means to return the valve to its initial position after a suitable time, thereby to pull rod 12 to the left and pull 18 to the right. Alternatively, the circuit may include a further microswitch connected to a valve-resetting portion thereof, such further microswitch being positioned to be engaged by a carrier support 3 after it has been deposited upon tracks 19 from the stack.

Figure 6:
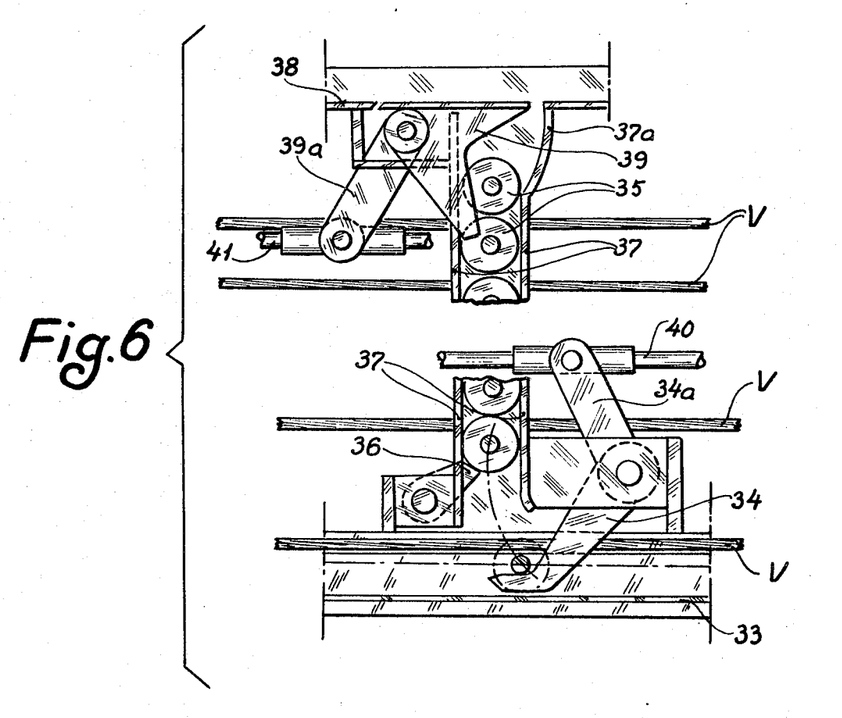
FIG. 6 is a fragmentary composite view generally similar to FIG. 3 but showing portions of a modified means for feeding elongated supporting means in a stack upwardly within the drying chamber, rather than downwardly therein as in the embodiment of FIGS. 1–5 inclusive.

The second embodiment of apparatus in accordance with the invention is generally similar to that of FIGS. 1–5, inclusive, except for the stack forming and stack feeding means. Such modified apparatus, which is shown in FIG. 6, feeds the first, entering carrier support into the drying compartment in the direction from left to right, and thence into the bottom of the stack. Upon the lifting of the thus fed carrier support into the stack, the carrier support thereby displaced from the upper end of the stack is then fed to the right out the right-hand end of the drying compartment in a manner similar to that of the first described embodiment.

In FIG. 6 there is shown a lower conveyor track along which a chain type carrier support is fed in a direction from left to right. When thus fed carrier support approaches its terminal position in a first, lower feeding plane, hooked lifting arms 34 are lowered into the solid position so that their ends lie beneath the stub exles bearing the transfer rolls on the support carrier. Thereupon the lifting arms 34 are rotated clockwise by means of push rods 40 which are pivotally connected to the respective lever arms 34a fixedly connected to its lifting arm 34. Such swinging of the lifting arm 34 lifts the lowermost carrier support so that the transfer rollers 35 thereof enter the lower end of respective longitudinally spaced vertical guiding means 37. At the upper end of such travel of the arm 34, the lifting rollers 35 displace a gravity actuated pawl 36, the pawl then returning to the solid line position thereof shown in FIG. 6 to retain the rollers 35 and the carrier support to which they are attached at the lower end of the guiding means 37.

Upon such lifting of a carrier support into the lower end of the stack, the transfer rollers 35 on the uppermost support member are disposed, as shown in FIG. 6, at the top of the stack. The uppermost carrier support is then lifted so that the rollers 35 thereof lie upon upper track rails 38. Thereupon such support carrier may then be conveyed toward the right-hand, exit end of the chamber. The lifting means is in the form of a forked plate 39, the upper portion of which lies horizontal and bridges a gap in the rails 38 when the member 39 is in its solid line position. The lower part of member 39 is then disposed rearwardly of the stub shaft bearing the transfer roller 35. The uppermost carrier support is lifted by means of a thrust rod 41 which is pivotally connected to a lever 39a which is affixed to the lifting member 39. Upon the thrusting of the rod 41 to the right (FIG. 6), the member 39 swings counterclockwise. The lower portion of member 39 then engages the stub shafts on such upper carrier support to lift such carrier support. At the same time, the upper portion of member 39 is retracted whereby to allow the transfer rollers 35 to clear it. The forward guide of vertical guide means 37 is provided with a curved portion 37a to permit the transfer rollers 35 to roll upwardly therealong while the carrier support is lifted. After such lifting of the carrier support, the lower portion of plate 39 then bridges the gap in track 38. The thus supported lifted carrier support is then traversed to the right. After the rollers 35 thereof have cleared the gaps in tracks 38, members 39 are swung clockwise thereby to restore them to their full line position so that the rollers 35 may then travel over the upper portions of such plates as such carrier support continues its travel to the right.

As already mentioned above, the invention can alternatively be applied to drying of sawed timber. The apparatus described above can, when used for this purpose, be similar in principle. The support plates and other support elements of the carrier supports can, however, be more widely spaced than in the case of veneer webs. The operation of the apparatus according to the invention as applied for this purpose could be, e.g., as follows.

From the length pre-adjustment step of the timber pieces, carried out on a chain table moving in a transverse direction with respect to the grain direction of the timber pieces, the timber pieces travel, for example, to a thickness meter, where the different thicknesses are separated onto planar tables where a timber mat is collected corresponding as to its width to that of the carrier support. The mat is made as compact as possible by positioning the pieces of different length so as to engage each other in mesh to obtain a high filling ratio in the dryer. The feeding of such a timber mat or layer into the dryer and its transfer through the same is carried out in the same manner as is hereinbefore set forth in connection with veneer layers. Because of the difference in the goods the carrier supports need, however, not be provided with side chains. The timber pieces discharged from the drying chamber can thereafter be passed to a simple width sorting step and thence either directly or through an intermediate storage to a final length adjustment, sorting and stamping step.

With this system, as compared with the conventional system, the loading table after the length preadjustment, the trucks, lifting cranes, roller beds and the slating step before the dryer can be eliminated and to replace them only an inexpensive thickness meter and the conveyers inside the drying chamber are required. The actual drying chamber with its accessories thus is somewhat more expensive than in the conventional system, but this is compensated by an improved filling ratio and a reduced heat consumption per evaporated unit weight of water. The conventional drying slats also are unnecessary, and their removal and disassembling of the load after the dryer are eliminated. Instead, a width sorting is necessary before the final quality sorting and length adjustment in case the timber pieces are separated before the drying chamber only according to thickness. This sorting is, however, a relatively simple step.

Although a limited number of embodiments of the invention have been illustrated in the accompanying drawings and described in the foregoing specification, it is to be especially understood that various changes, such as in the relative dimensions of the parts, materials used, and the like, as well as the suggested manner of use of the apparatus of the invention, may be made therein without departing from the spirit and scope of the invention, as will now be apparent to those skilled in the art.

I claim:

1. A method of drying sheet-like material which comprises feeding such material and a first elongated carrier support into an elongated drying chamber in a first plane layer supported on said carrier, after the first carrier support and the layer of material thereon are at a terminal position within the chamber moving them in a direction substantially normal of their broad extents a distance which is at least equal to the combined thickness of the first carrier support and the layer of material thereon into a second plane parallel to said first plane, successively forming further layers of materials upon respective successive carrier supports in the first plane in the drying chamber, feeding each of said further carrier supports and the layers of material thereon into stacked position with respect to the first fed carrier support and layer, thereafter moving each thus fed further carrier support and layer out of said first plane into said second plane in stacked relationship to the first carrier support and layer, circulating a heated drying gas in intimate contact with the layers of material on the carrier supports in the stack, and feeding successive carrier supports with their substantially dried layers of material thereon from the other end of the stack and thence out of the drying chamber.

2. A method according to claim 1, comprising retaining the layers of material being dried between the upper surfaces of the support carriers and the lower surfaces of the next upper support carriers so that the layers of materials are prevented from appreciable bulging while drying but are allowed to shrink freely longitudinally.

3. A method according to claim 1, comprising passing the drying gas generally vertically through the drying chamber, and moving the carrier supports and the layers of material thereon in the stack in a direction opposite to the general direction of flow of the drying gas through the chamber.

4. A method according to claim 3, wherein the drying gas passes generally upwardly through the drying chamber, and the carrier supports and the layers of material thereon are successively added to the upper end of the stack, are transferred step by step downwardly through the stack, and are discharged at the lower end of the drying chamber.

5. A method according to claim 1, comprising separating the layer of dried material from each support carrier substantially as the support carrier is discharged from the drying chamber, returning such carrier support to the feeding end of the drying chamber, and forming a new layer of material on said carrier while feeding it into the drying chamber.

6. Apparatus for drying material in layers comprising an elongated drying chamber, a plurality of elongated carrier supports for the material, means for feeding said carrier supports with a layer of material thereon successively into the chamber, means for forming a stack of said loaded carrier supports within the chamber, means for feeding said loaded carrier supports with their layers of substantially dried material successively from the stack and out of the chamber, and means for circulating heated drying gas in contact with the layers of material while such layers are thus held on the support carriers in the stack.

7. Apparatus according to claim 6, wherein the stack of carrier supports and layers of material thereon is disposed vertically within the drying chamber, and wherein the means for feeding the carrier supports and layers of material thereon into the drying chamber feeds them in a horizontal plane parallel to the plane of the carrier support adjacent a first, infeeding end of the stack, and comprising means for moving a carrier support and its layer of material when they have been fed to a terminal position within the chamber from said first plane in a direction substantially normal thereto into said first end of the stack, means for simultaneously discharging the carrier support and layer at the other end of the stack from the stack, and means for successively transferring carrier supports discharged from the stack out of the drying chamber at the discharge end thereof.

8. A drying chamber according to claim 6, comprising means for removing dried material from the support carrier substantially as the support carrier issues from the drying chamber, and means for thereafter returning the thus emptied support carrier to the feeding end of the drying chamber.

9. Apparatus according to claim 6, wherein each carrier support consists of spaced parallel flexible members, transverse supporting elements connected to and spanning the distance between the flexible members, laterally spaced tracks in the drying chamber, and longitudinally spaced transfer wheels on the support carrier engaging the tracks to support the carrier support as such support is fed into the chamber, the transfer wheels of successive carrier supports being in engagement when the carrier supports are in the stack, the parts being so constructed and arranged that the lower surfaces of the transverse supporting elements while in the stack to prevent bulging of the layers of material during drying but permitting the layers of material to shrink freely longitudinally.

10. Apparatus according to claim 9, wherein each carrier support consists of spaced parallel chains having links pivotable with respect to each other in one direction only, and comprising means guidingly receiving the transfer wheels of the carrier supports to retain such carrier supports in the stack.

11. Apparatus according to claim 9, comprising a plurality of longitudinally spaced vertical guideways fixed with respect to the drying chamber, said vertical guideways being spaced the same distance as successive transfer wheels on the carrier supports and being adapted to receive said transfer wheels to hold the carrier supports in said stack, said vertical guideways being disposed beneath the horizontal tracks of the feeding means which support the transfer wheels, means comprising an adjacent feeding conveyor having means engaging the carrier supports for moving them along said tracks, said tracks being provided with gaps spaced longitudinally thereof at distances corresponding to the spacing of the transfer wheels on the carrier supports, and selectively operated gates disposed at the upper ends of the vertical guideways for opening said gaps to admit the transfer wheels of a support carrier to said vertical guideways and for thereafter closing said gaps.

12. Apparatus according to claim 7, wherein the means for discharging the support carriers from the drying chamber consists of a lower substantially horizontal track for supporting the transfer wheels of the carrier supports, said lower track extending beneath the bottom of the stack, and a further adjacent discharge conveyor having means engaging the carrier supports on the lower track to feed such carrier supports from the chamber.

13. Apparatus according to claim 12, wherein said second lower track is extended outwardly beyond the discharge end of the drying chamber to the feeding end of the chamber, the second adjacent discharge conveyor is similarly extended and lies parallel to the second track, whereby a support carrier discharged from the drying chamber may be returned by the second conveyor to the feeding end of the drying chamber along said second track.

14. Apparatus according to claim 11, comprising a common control means for operating all of the gates in unison, and comprising plate-like guideway closing members disposed at the lower end of the vertical guideways, and a common control means for operating all of the plate-like closing members in unison.

15. Apparatus according to claim 14, wherein said plate-like closing members are rotatably mounted in vertical planes, each of said members having a portion cooperating with the carrier supports to lower the lowermost carrier support in the stack to the lower tracks, said plate-like closing members also having a portion for closing the lower end of the vertical guideways during the lowering of said lowermost carrier support.

16. Apparatus according to claim 15, comprising means for simultaneously operating the control means for the gates and the control means for the plate-like closing members, whereby a carrier support is discharged from one end of the stack at the same time as another carrier support is fed into the other end of the stack.

References Cited

UNITED STATES PATENTS 2,718,069  9/1955  Nofziger et al. _________ 34—38
1,228,790  6/1917  Lambert _____________ 34—6

KENNETH W. SPRAGUE, *Primary Examiner.*

U.S. Cl. X.R.

34—38, 216